(12) United States Patent
Maeda et al.

(10) Patent No.: US 11,163,148 B2
(45) Date of Patent: Nov. 2, 2021

(54) TELESCOPE SYSTEM

(71) Applicant: Japan Aerospace Exploration Agency, Chofu (JP)

(72) Inventors: Yoshitomo Maeda, Chofu (JP); Manabu Ishida, Chofu (JP); Ryo Iizuka, Chofu (JP); Takayuki Hayashi, Chofu (JP)

(73) Assignee: Japan Aerospace Exploration Agency, Tokyo (JP)

( * ) Notice: Subject to any disclaimer, the term of this patent is extended or adjusted under 35 U.S.C. 154(b) by 214 days.

(21) Appl. No.: 16/479,533

(22) PCT Filed: Jan. 23, 2018

(86) PCT No.: PCT/JP2018/001892
§ 371 (c)(1),
(2) Date: Jul. 19, 2019

(87) PCT Pub. No.: WO2018/139425
PCT Pub. Date: Aug. 2, 2018

(65) Prior Publication Data
US 2019/0384052 A1    Dec. 19, 2019

(30) Foreign Application Priority Data

Jan. 24, 2017    (JP) .............................. JP2017-010430

(51) Int. Cl.
*G02B 23/00* (2006.01)
*G02B 23/10* (2006.01)
*H01J 31/49* (2006.01)

(52) U.S. Cl.
CPC ........... *G02B 23/145* (2013.01); *G02B 23/10* (2013.01); *H01J 31/49* (2013.01)

(58) Field of Classification Search
CPC ........ G02B 23/16; G02B 23/06; G02B 23/00; G02B 23/02; G02B 23/12; G02B 23/14;
(Continued)

(56) References Cited

U.S. PATENT DOCUMENTS 3,979,596 A * 9/1976 Shaw ..................... G01N 21/53
250/575
5,365,367 A * 11/1994 Zehnpfennig .......... G02B 27/58
359/399

(Continued)

FOREIGN PATENT DOCUMENTS

JP    2003195184    7/2003
JP    2017187716    10/2017

OTHER PUBLICATIONS

Soong et al., "ASTRO-H Soft X-ray Telescope (SXT)", Proc. of SPIE, vol. 9144 914428 1-14.
(Continued)

*Primary Examiner* — William R Alexander
*Assistant Examiner* — Sharrief I Broome
(74) *Attorney, Agent, or Firm* — McDonnell Boehnen Hulbert & Berghoff LLP (57) ABSTRACT

A telescope system includes a telescope and a selective shielding unit including at least one member including a passage allowable region for an observation target electromagnetic wave and a passage blocking region for the observation target electromagnetic wave. The telescope includes a position detectable detector that detects the observation target electromagnetic wave on a surface different from a focal plane of the telescope. The selective shielding unit is disposed on a front side of the detector. Patterns of the
(Continued)

passage allowable region and the passage blocking region of the at least one member and disposition of the at least one member are set to allow for reconstruction of an observation image based on an image detected in the detector.

9 Claims, 8 Drawing Sheets

(58) Field of Classification Search
CPC .............. G02B 23/04; G02B 17/0808; G02B 17/0896; G02B 23/20; G02B 26/06; G02B 27/0025; G02B 27/646; G02B 17/0663; G02B 17/0852; G02B 23/125; G02B 23/18; G02B 26/0816; G02B 27/0018; G02B 27/34; F41G 1/38; F41G 1/30; F41G 1/345; F41G 3/08; F41G 11/00; F41G 1/26; F41G 1/32; F41G 1/383; F41G 1/40; F41G 1/473; F41G 3/06; F41G 3/065; F41G 3/142; F41G 3/165; F41G 3/2605
See application file for complete search history.

(56) References Cited

U.S. PATENT DOCUMENTS

| | | | | |
|---|---|---|---|---|
| 5,838,757 | A | * 11/1998 | Vartanian | ............... G21K 7/00 378/43 |
| 2002/0089739 | A1 | * 7/2002 | Takizawa | ............... B82Y 10/00 359/359 |
| 2005/0122603 | A1 | * 6/2005 | Takizawa | ............... G02B 23/06 359/857 |
| 2007/0286461 | A1 | * 12/2007 | Deforest | ............... G02B 26/00 382/103 |

OTHER PUBLICATIONS

Oda, "High-Resolution X-Ray Collimator with Broad Field of View for Astronomical Use," Applied Optics, 4, 143 (1965).
Fenimore and Cannon, "Coded aperture imaging with uniformly redundant arrays", Applied Optics vol. 17, No. 3, 337-347, 1978.
International Search Report of International Application No. PCT/JP2018/001892 dated Apr. 24, 2018, 4 pages.
Written Opinion of the International Search Report of International Application No. PCT/JP2018/001892, dated Apr. 24, 2018, 4 pages.
JPN Journal of Optics, 1999, pp. 363-371.
JPN Society of Applied Physics, 1966, pp. 445-451.

* cited by examiner

| SELECTIVE SHIELDING UNIT IS ABSENT | SELECTIVE SHIELDING UNIT IS PRESENT SLIT CENTRAL ANGLE 0.1° | SELECTIVE SHIELDING UNIT IS PRESENT SLIT CENTRAL ANGLE 0.025° |
|---|---|---|
|  0.00° |  0.00° |  0.00° |
|  0.05° |  0.05° |  0.05° |
|  0.20° |  0.20° |  0.20° |
|  1.00° |  1.00° |  1.00° |
| 0 6 16 24 32 40 48 58 64 72 80 | 0 40 80 120 160 200 240 280 320 360 400 | 0 2 4 6 8 10 12 14 16 18 20 |
| NUMBER OF DETECTED X-RAYS | NUMBER OF DETECTED X-RAYS | NUMBER OF DETECTED X-RAYS |

TELESCOPE SYSTEM

CROSS REFERENCE TO RELATED APPLICATIONS

This application is a national stage application under 35 U.S.C. § 371 of International Application No. PCT/JP2018/001892, filed Jan. 23, 2018, which claims the benefit of priority from Japanese Patent Application No. 2017-010430, filed on Jan. 24, 2017. The disclosures of all of the above applications are incorporated by reference herein in their entireties.

FIELD OF THE INVENTION

The present invention relates to a telescope system and, more particularly, to a telescope system that achieves, in addition to good sensitivity of a telescope, resolution exceeding the resolution of the telescope alone.

BACKGROUND OF THE INVENTION

It is effective to increase sensitivity and resolution using a telescope system having a high light condensing ability in order to observe a feeble light source such as a celestial body. For example, a telescope system including an X-ray telescope and a two-dimensional detector placed on a focal plane of the X-ray telescope achieves high sensitivity and high resolution thanks to its high light condensing ability (see, for example, Non-patent document 1 described below).

As a high-resolution system not including the X-ray telescope, an observation system in which a microstructure is provided in front of a detector of the observation system using a modulation collimator or an encoding mask, has been developed to achieve resolution in a degree of an arc second (see, for example, Non-patent documents 2 and 3).

CITATION LIST

Non-Patent Literature

[Non-patent document 1] Yang Soong et al. "ASTRO-H Soft X-ray Telescope (SXT)", Proc. of SPIE Vol. 9144 914428 1-14
[Non-patent document 2] M. Oda, "High-Resolution X-Ray Collimator with Broad Field of View for Astronomical Use," Applied Optics, 4, 143 (1965)
[Non-patent document 3] E. E. Fenimore and T. M. Cannon, "Coded aperture imaging with uniformly redundant arrays", Applied Optics Vol. 17 No. 3 337-347, 1978

SUMMARY OF INVENTION

Problem to be Solved by the Invention

However, the performance of an X-ray telescope is limited by mirror surface roughness accuracy, mirror surface shape accuracy, and positioning accuracy of a reflector. That is, although an X-ray telescope having a large light condensing area is attained by combining reflectors, an incident angle on the reflectors is limited to oblique incidence. Therefore, a manufacturing method for reducing the reflectors in thickness and superimposing the reflectors in multiple layers is generally adopted. To increase the light condensing area, it is necessary to superimpose a larger number of the thin reflectors. However, since shape accuracy and accurate positioning of the reflectors are difficult, it is difficult to improve the resolution of a telescope system.

The observation system including the modulation collimator or the encoding mask does not perform light condensing. Therefore, the area of the entire microstructure of the observation system and the area of the detector are substantially the same, and a background of the detector is high and detection sensitivity is low.

Therefore, an object of the present invention is to provide a telescope system that achieves, in addition to the original high sensitivity of a telescope, resolution exceeding the resolution of the telescope alone.

Means for Solving Problem

One aspect of the present invention provides a telescope system including: a telescope; and a selective shielding unit including at least one member including a passage allowable region for an observation target electromagnetic wave and a passage blocking region for the observation target electromagnetic wave. The telescope includes a position detectable detector that detects the observation target electromagnetic wave on a surface different from a focal plane of the telescope. The selective shielding unit is disposed further on a front side than the detector. Patterns of the passage allowable region and the passage blocking region of the at least one member and disposition of the at least one member are set to allow for reconstruction of an observation image based on an image detected in the detector.

The telescope system may further include an image reconstructing device that reconstructs the observation image based on the image detected in the detector.

The reconstruction may be performed by inversely transforming the image detected in the detector.

The reconstruction may be performed by acquiring, in advance, a correspondence relation between an incident angle of an electromagnetic wave and a pattern of an image detected in the detector with respect to the electromagnetic wave at the incident angle and referring to the acquired correspondence relation.

The telescope may be an X-ray telescope including a plurality of reflectors arranged in a concentric and layered manner.

The passage allowable region and the passage blocking region may be each radially formed on the member.

Effect of the Invention

According to the present invention including the configuration explained above, it is possible to provide a telescope system that achieves, in addition to the original high sensitivity of a telescope, resolution exceeding the resolution of the telescope alone.

DESCRIPTION OF EMBODIMENTS

A telescope system according to the present invention is explained below with reference to the drawings. The configuration of the telescope system according to the present invention is not limited to a particular specific configuration shown in the drawings and may be modified as appropriate within the scope of the present invention. For example, in the following explanation, a radiation source is located at infinity and a member included in a selective shielding unit is a slit member. However, a passage allowable region in the member does not need to be a slit and may be filled with any material having permeability for an observation target electromagnetic wave. The observation target electromagnetic wave is not limited to an X-ray and may be an electromagnetic wave in any wavelength region.

Figure 1:
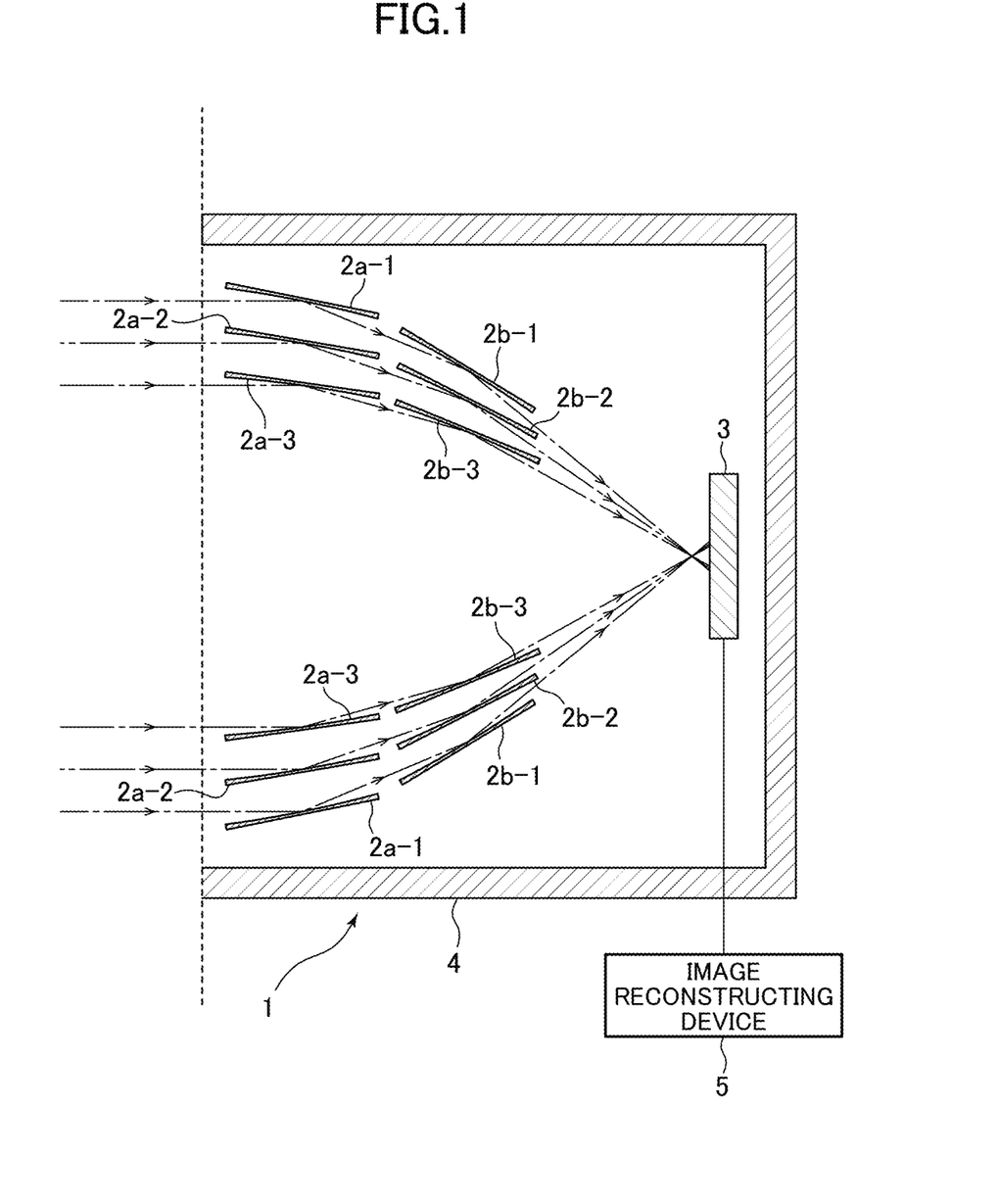
FIG. 1 is a configuration schematic diagram of an X-ray telescope to which a selective shielding unit is attached in an embodiment of the present invention.

A configuration schematic diagram of an X-ray telescope to which a selective shielding unit is attached in an embodiment of the present invention is shown in FIG. 1. An X-ray telescope 1 includes a plurality of reflectors 2a-1 to 2a-3 and 2b-1 to 2b-3 in a housing 4 and includes a detector 3 for detecting an image on a surface different from a focal plane. The reflectors 2a-1 to 2a-3 and 2b-1 to 2b-3 each have a shape of a partial side surface of a cone (a side surface of a solid remaining on a bottom surface side of the cone when the cone is cut halfway in the height direction from the bottom surface to the vertex of the cone) and are disposed to be formed in concentric circle shapes when viewed from a direction perpendicular to an entrance surface (in FIG. 1, indicated by a dotted line) of the X-ray telescope 1. The reflectors 2a-1 to 2a-3 are arranged in a layered (nested) manner. The reflectors 2b-1 to 2b-3 are also arranged in a layered (nested) manner.

An X-ray made incident from an entrance surface of the X-ray telescope 1 and reflected on the reflector 2a-1 is reflected again on the reflector 2b-1 and guided to a focal plane. Similarly, X-rays reflected on the reflectors 2a-2 and 2a-3 are reflected again on the respective reflectors 2b-2 and 2b-3 and guided to the focal plane. An image is formed on the focal plane by the X-rays reflected twice. A out-of-focus image of this image is detected by a two-dimensional detector 3 or the like capable of detecting a position disposed on the rear side of the focal plane. The two-dimensional detector 3 may be disposed on the front side rather than the rear side of the focal plane. An electric signal indicating a detection result is transmitted to an image reconstructing device 5.

Figure 2:
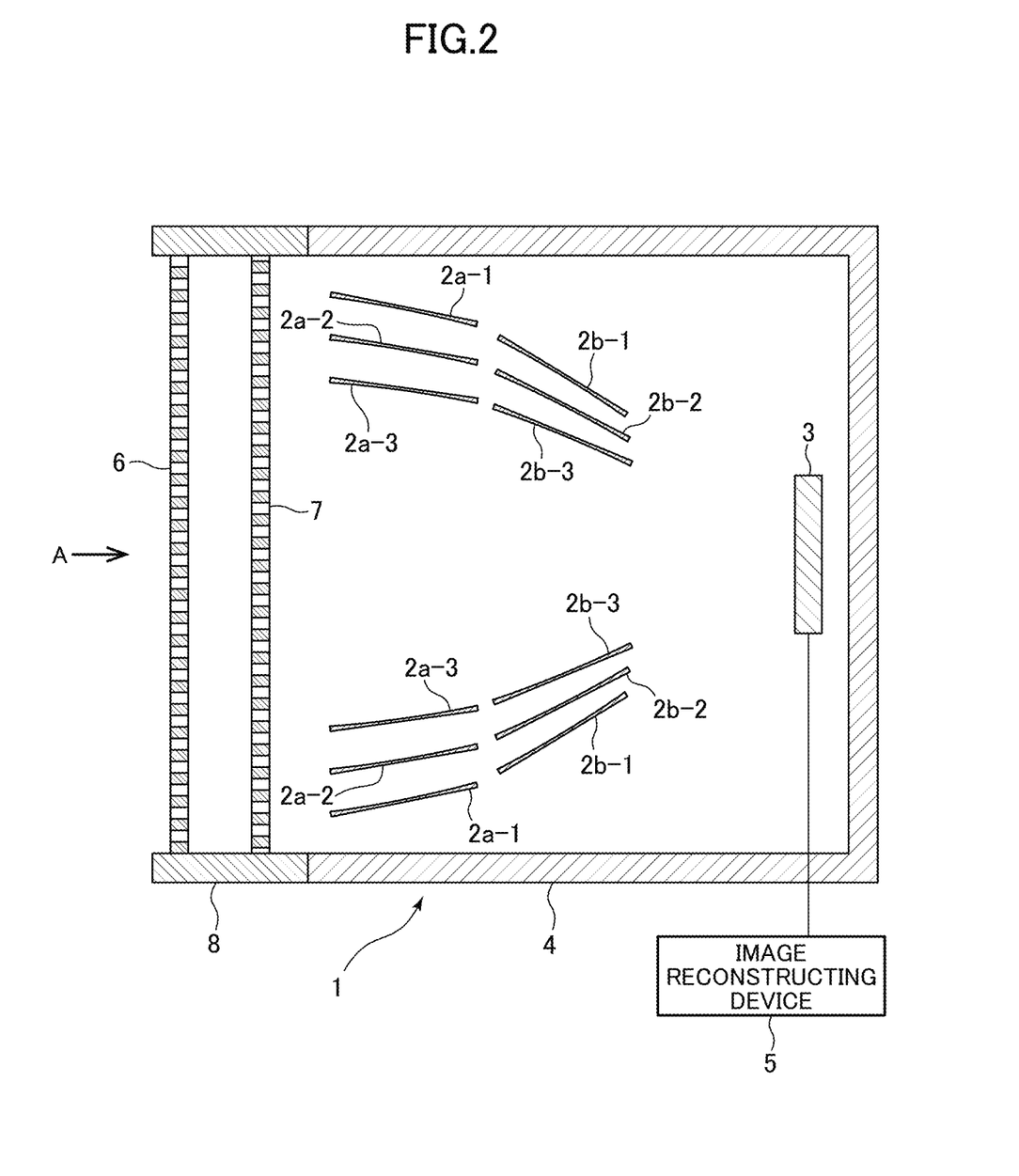
FIG. 2 is a configuration schematic diagram of an X-ray telescope system in which the selective shielding unit is attached to the X-ray telescope shown in FIG. 1.

A configuration schematic diagram of an X-ray telescope system in which a selective shielding unit is attached to the X-ray telescope 1 shown in FIG. 1 is shown in FIG. 2. The selective shielding unit has a structure including a first slit member 6, a second slit member 7, and a holding member 8 that holds the first and second slit member 6 and 7. The selective shielding unit is attached in front of the entrance surface of the X-ray telescope 1. Consequently, an X-ray about to be made incident on the X-ray telescope 1 receives action of the selective shielding unit first. Note that the selective shielding unit may be disposed in any appropriate position on the front side of the two-dimensional detector 3.

Figure 3A:
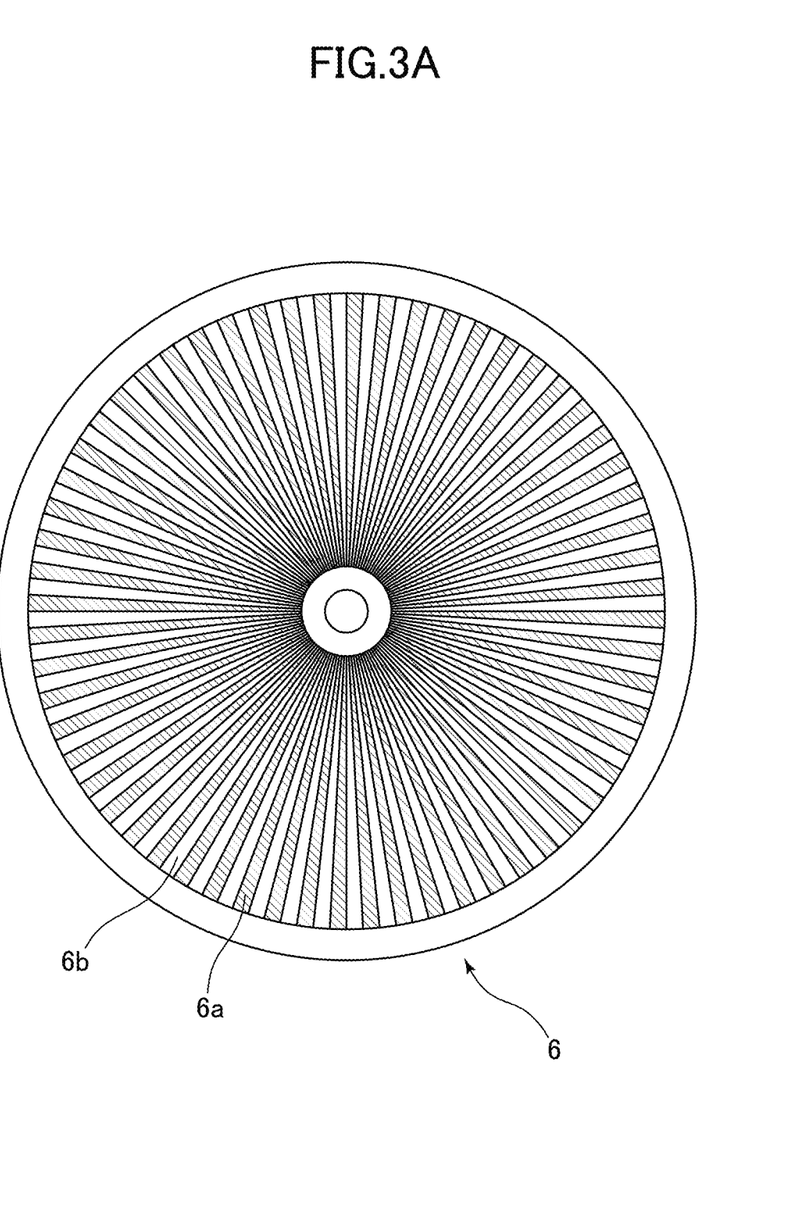
FIG. 3A is a configuration schematic diagram of an example of a first slit member 6 included in the selective shielding unit, the example of the first slit member 6 being viewed from a direction of an arrow A in FIG. 4.
Figure 3B:
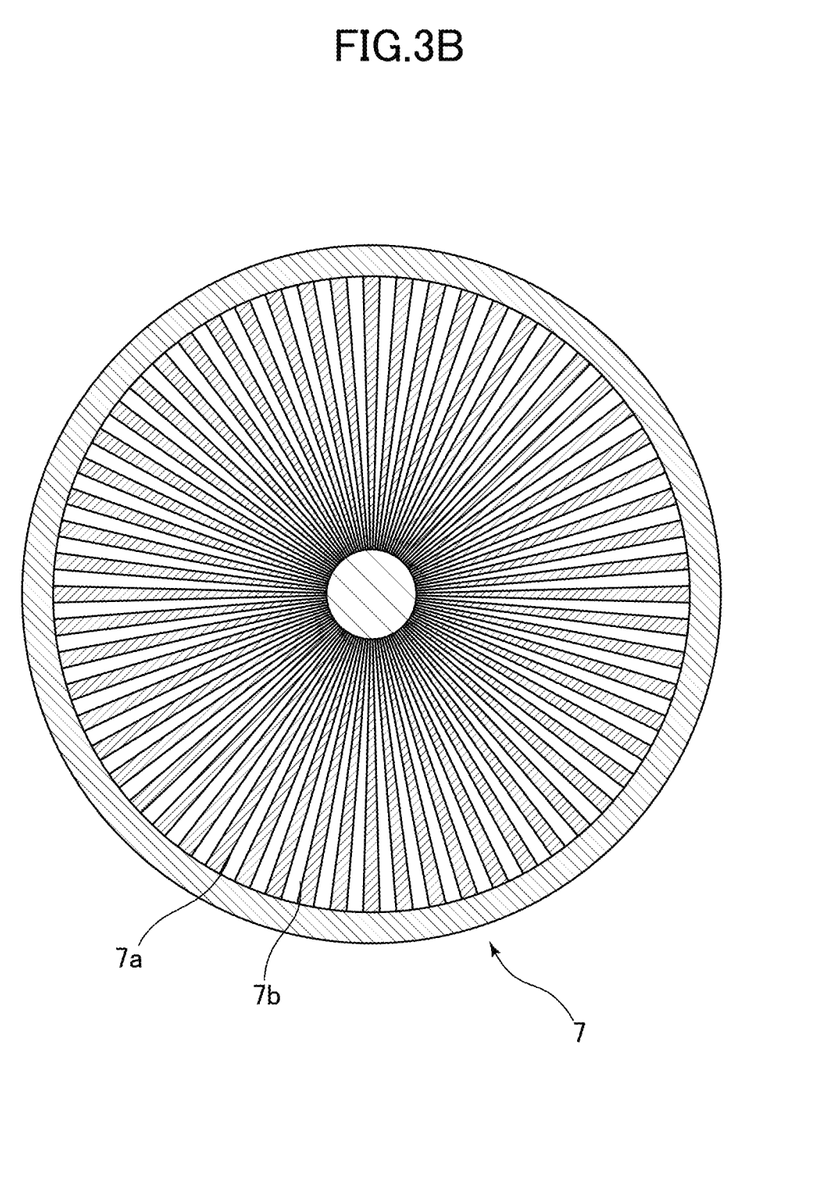
FIG. 3B is a configuration schematic diagram of an example of a second slit member 7 included in the selective shielding unit, the example of the second slit member 7 being viewed from the direction of the arrow A in FIG. 4.

The first slit member 6 and the second slit member 7 each have a disk-like shape in which slits are opened. A configuration schematic diagram at the time when an example of the first slit member 6 is viewed from a direction of an arrow A in FIG. 2 is shown in FIG. 3A. A configuration schematic diagram at the time when an example of the second slit member 7 is viewed from the direction of the arrow A in FIG. 2 is shown in FIG. 3B.

In the first slit member 6, passage blocking regions 6a formed of a material for blocking passage of an X-ray and slits (passage allowable regions) 6b, through which the X-ray may pass, are alternately formed. Each of the passage blocking regions 6a and the slits 6b are formed in fan shapes having an equal fixed angle. Note that, in FIG. 3A and FIG. 3B, for simplification, the passage blocking regions and the passage allowable regions are shown large. However, the regions may be formed in a structure finer than the regions shown in the figures.

In the second slit member 7, as in the first slit member 6, passage blocking regions 7a formed of a material for blocking passage of an X-ray and slits (passage allowable regions) 7b, through which the X-ray may pass, are alternately formed. As shown in FIG. 2, the first and second slit members 6 and 7 are arranged in a layered manner with a space therebetween. However, when viewed from the direction of the arrow A in FIG. 2, the first and second slit members 6 and 7 are disposed such that positions of the slits 6b on the first slit member 6 and positions of the slits 7b on the second slit member 7 are shifted from each other by a half angle of a central angle of the slits 6b and 7b.

Figure 4:
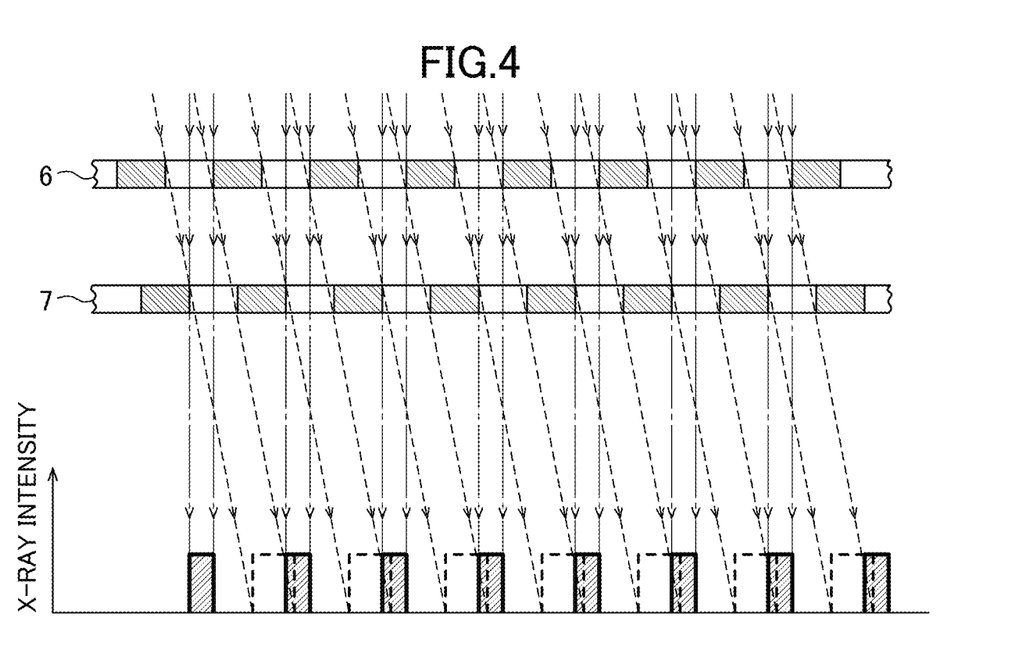
FIG. 4 is a diagram schematically showing a pattern of an image formed on a two-dimensional detector 3 by X-rays incident from a direction perpendicular to a principal plane of the selective shielding unit and a direction inclined with respect to the principal plane of the selective shielding unit.

FIG. 4 is a diagram schematically showing a pattern of an image formed on the two-dimensional detector 3 by X-rays made incident from a direction perpendicular to a principal plane of the selective shielding unit (an optical axis direction in this embodiment) and a direction inclined with respect to the principal plane of the selective shielding unit. That is, the incident X-rays are focused by an optical system of a telescope but, since the two-dimensional detector 3 is disposed in a position different from the focal plane, a out-of-focus image of the X-rays is formed on the two-dimensional detector 3. An image actually formed on the two-dimensional detector 3 by the incident X-rays is an image reduced by the optical system of the telescope.

Therefore, the two-dimensional detector 3 is not a detector that detects an image of an incident X-ray focused on one point. As it is seen from FIG. 4, an (reduced) image of a pattern different according to an incident angle is detected by the two-dimensional detector 3. That is, a convolution image of the incident X-ray and the pattern of the selective shielding unit is detected in the two-dimensional detector 3. Therefore, an observation image may be reconstructed by inversely transforming the image. If there are a plurality of radiation sources and spread radiation, a superimposition image obtained by convoluting a luminance distribution of the radiation sources and the spread radiation with the pattern of the selective shielding unit is detected in the two-dimensional detector 3. Therefore, an observation image may be reconstructed by inversely transforming the image.

Since different images of the pattern are detected according to different incident angles by the two-dimensional detector 3 as explained above, the following configuration may be adopted instead of the inverse transformation. That is, a correspondence relation between an incident angle of an incident X-ray and a pattern of an image detected in the two-dimensional detector 3 with respect to the X-ray at the incident angle may be acquired by calculation or actual measurement. An observation image may be reconstructed, with reference to the acquired correspondence relation, from an image detected in the two-dimensional detector 3 with respect to an observation target X-ray.

If patterns of slits of slit members and passage blocking regions and disposition of the slit members are set to allow for reconstruction of an observation image based on an image detected by the two-dimensional detector, the selective shielding unit may have any appropriate configuration such as any appropriate patterns of the slits and the passage blocking regions, number of the slit members, and disposition of the slit members.

For example, the shapes of the passage blocking regions and the slits may take various shapes other than the fan shapes shown in FIG. 3A and FIG. 3B. When inverse fast Fourier transform is used for reconstruction of an observation image, calculation may be quickly performed if the shape of the slits is set to a shape with which dimensions of portions of the slits and among the slits are in a relation of power of ½.

The detector only has to be capable of detecting a position. A one-dimensional detector may be used instead of the two-dimensional detector 3.

The selective shielding unit may be designed as a unit separate from the X-ray telescope 1 itself. Therefore, if a slit pattern is finely formed, it is also possible to achieve resolution exceeding the resolution of the telescope. It is likely that the influence of interference due to passage of the observation target electromagnetic wave through the slit occurs when a scale of the slit pattern and a wavelength scale of the observation target electromagnetic wave are close. Therefore, it is effective to take, as a wavelength region of the observation target electromagnetic wave, a wavelength region (e.g., 100 Å (angstrom) or less) in which a wavelength is sufficiently shorter than the slit pattern.

After an SXT telescope (see FIG. 6 of Non-patent document 3) mounted on an ASTRO-H satellite was finely adjusted, detection images obtained by observing X-rays while changing an incident angle were calculated by a computer simulation about an X-ray telescope system attached with a selective shielding unit including two slit members including a large number of the slits having the fan shapes explained with reference to FIG. 3A and FIG. 3B and an X-ray telescope system not attached with the selective shielding unit.

The SXT telescope was set to a focal length of 5.6 m and an incident diameter of 450 mm. Two hundred three layers of reflection surfaces made of gold were concentrically disposed (see Table 1 of Non-patent document 1). About the first and second slit members 6 and 7, a simulation was performed when the diameter of a representative surface shown in FIG. 3A and FIG. 3B was set to 450 mm (in FIG. 3A and FIG. 3B, an outer frame of an annular shape and a circular region present in the center were necessary in terms of structure and were assumed to be absent in this simulation) and both of the passage blocking regions 6a and 7a and the slits 6b and 7b had fan shapes, central angles of which were 0.1° (degree), and were disposed to be shifted 0.05° (degree) from each other and when both of the passage blocking regions 6a and 7a and the slits 6b and 7b had fan shapes, central angles of which were 0.025° (degree), and were disposed to be shifted 0.0125° (degree) from each other. The thickness of the first and second slit members was set to zero and it was assumed that the passage blocking regions 6a and 7a were made of a substance having an infinite X-ray absorption ratio. An interval between the first and second slit members was set to 1000 mm. The two-dimensional detector 3 was assumed to be a 30 mm square and have a pixel size of 0.1 mm×0.1 mm and was assumed to be disposed in a position apart from the focus of the SXT telescope backward in the optical axis direction by 500 mm.

Under the conditions described above, a situation in which X-rays were made incident on the X-ray telescope from infinity at a predetermined incident angle was simulated by the Monte Carlo method. X-ray intensity was calculated by counting X-rays detected in positions of the two-dimensional detector.

Figure 5:
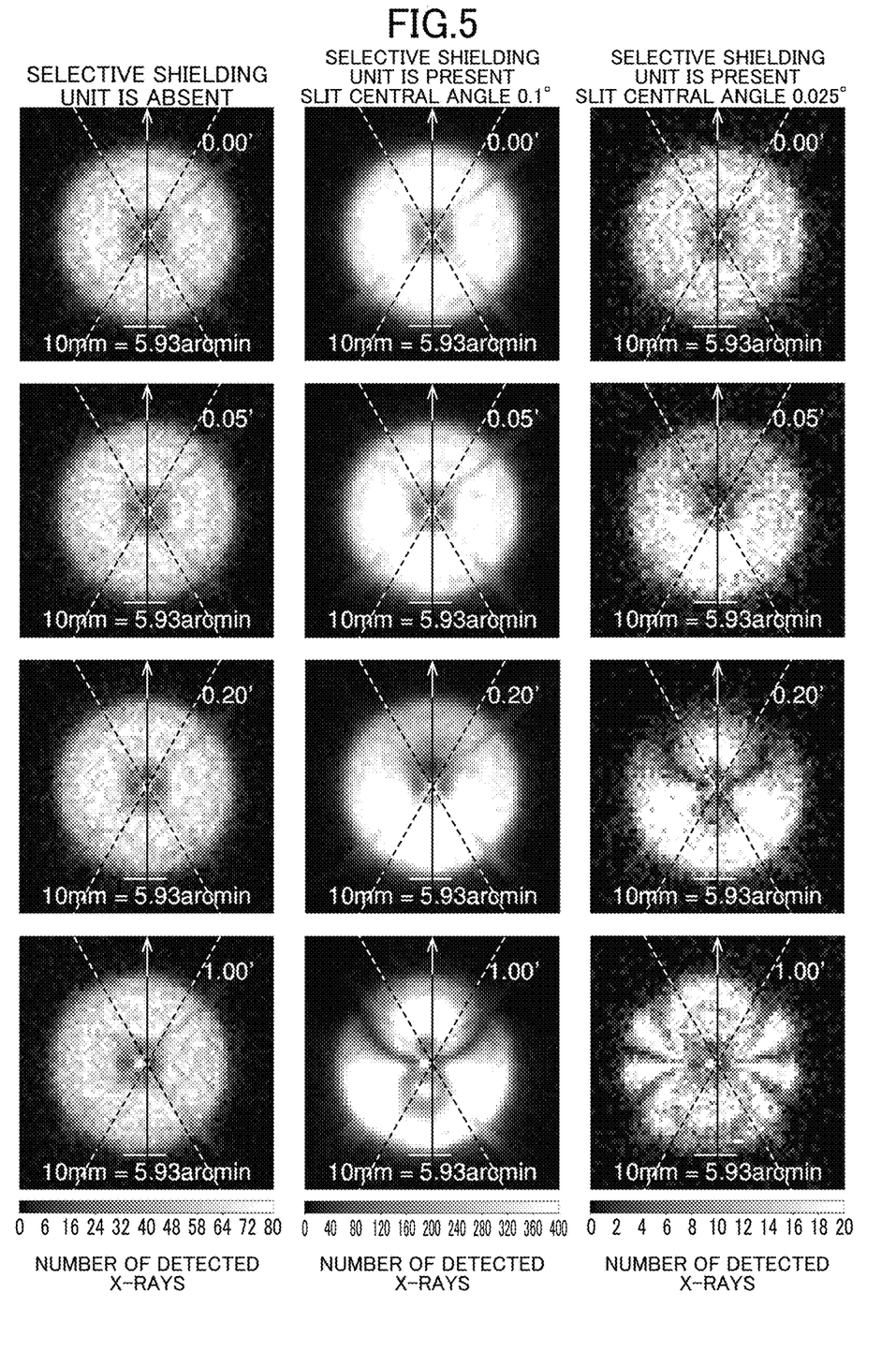
FIG. 5 is a diagram showing detection images obtained by observing X-rays while changing an incident angle, the detection images being calculated by a computer simulation about an X-ray telescope system with selective shielding units attached thereto, the selective shielding units having respective central angles of slits of 0.1° and 0.025°, and an X-ray telescope system with no selective shielding unit attached thereto.
Figure 6A:
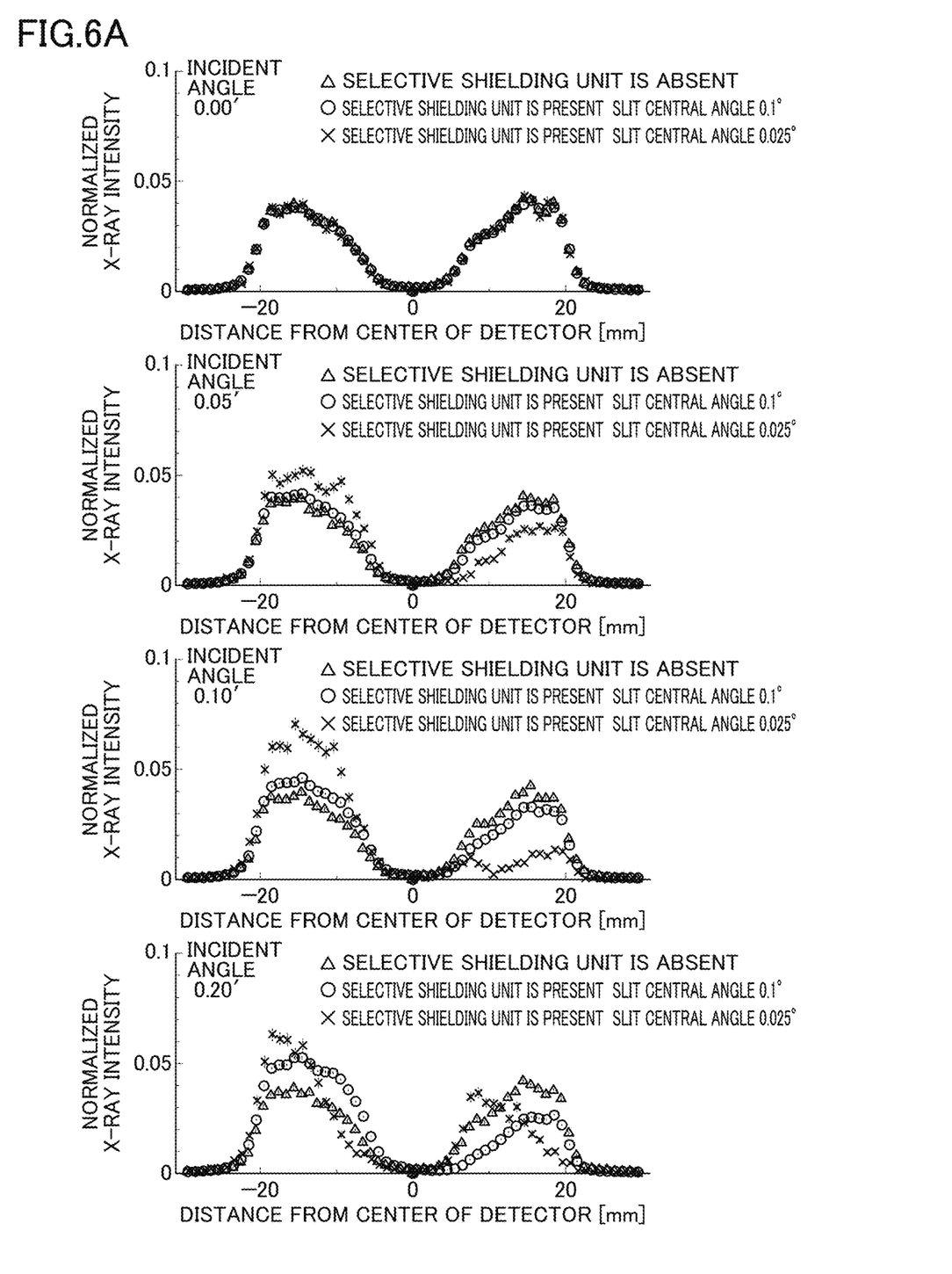
FIG. 6A is a diagram showing X-ray intensities on an axis in the vertical direction passing the center of a detection surface of the two-dimensional detector 3, the X-ray intensities being calculated by the computer simulation about the X-ray telescope system with the selective shielding units attached thereto, the respective central angles having respective central angles of slits of 0.1° and 0.025°, and the X-ray telescope system with no selective shielding unit attached thereto.
Figure 6B:
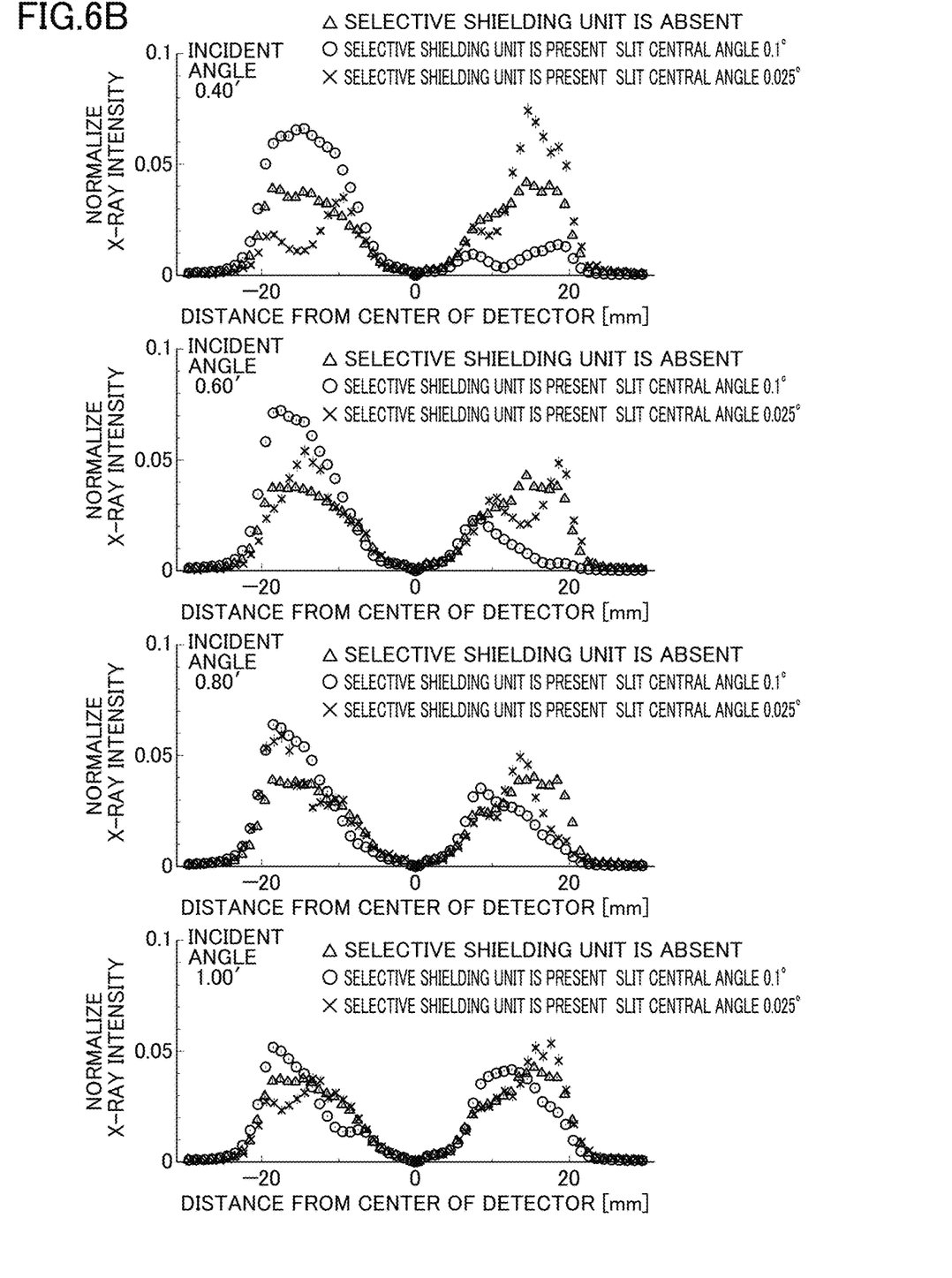
FIG. 6B is a diagram showing X-ray intensities on the axis in the vertical direction passing the center of the detection surface of the two-dimensional detector 3, the X-ray intensities being calculated by the computer simulation about the X-ray telescope system with the selective shielding units attached thereto, the selective shielding units having respective central angles of slits of 0.1° and 0.025°, and the X-ray telescope system with no selective shielding unit attached thereto.

Simulation results of detection images obtained when the selective shielding unit is absent, when the central angle of the slit of the selective shielding unit is 0.1°, and when the central angle of the slit of the selective shielding unit is 0.025° are respectively shown in FIG. 5, FIG. 6A to FIG. 6B.

In FIG. 5, about X-ray intensities on the detection surface of the two-dimensional detector detected when the incident angle is 0.00' (minute), 0.05', 0.20', and 1.00', X-ray intensities detected when the selective shielding unit is absent are shown on a left row, X-ray intensities detected when the central angle of the slit of the selective shielding unit is 0.1° are shown on a center row, and X-ray intensities detected when the central angle of the slit of the selective shielding unit is 0.025° are shown on a right row.

In FIG. 6A and FIG. 6B, X-ray intensity profiles on an axis in the vertical direction passing the center of the detection surface of the two-dimensional detector 3 shown in FIG. 5 are shown about cases in which the incident angle is 0.00', 0.05', 0.10', 0.20', 0.40', 0.60', 0.80', and 1.00'. X-ray intensities shown in FIG. 6A and FIG. 6B are obtained by normalizing, with a total number of detected X-rays, the numbers of detected X-rays in positions on the detection surface of the two-dimensional detector 3. The X-ray intensities mean intensity probabilities. Note that, for simplification of a simulation, X-ray intensities at points on the axis are set to the numbers of detected X-rays detected on an arc passing the points on the axis sandwiched by broken lines shown in the figures.

From FIG. 5 and FIG. 6A and FIG. 6B, whereas a change was hardly observed in the X-ray intensity profile with respect to a change in the incident angle from 0.00' (minute) to 1.00' when the selective shielding unit was absent, a change was observed in the X-ray intensity profile with respect to a change in the incident angle when the selective shielding unit was present. It was seen that, as the central angle of the slit was smaller, that is, as the structure of the selective shielding unit was finer, the detection image changed more sensitively to the change in the incident angle. Specifically, it was seen that, whereas resolution was approximately 1.0' when the selective shielding unit was absent, resolution of at least 0.2' was obtained when the central angle of the slit of the selective shielding unit was 0.1° and resolution of at least 0.05' was obtained when the central angle of the slit of the selective shielding unit was 0.025°. Therefore, it was seen that the resolution was improved by providing the selective shielding unit and the resolution was further improved as patterns of the slit of the selective shielding unit and the passage blocking region were finer. It is seen that it is possible to estimate an incident angle if a correspondence relation between an incident angle of an electromagnetic wave and a pattern of an image detected in the two-dimensional detector 3 with respect to the electromagnetic wave at the incident angle is acquired in advance and the acquired correspondence relation is referred to.

According to this embodiment, since a background may be suppressed low by a light condensing ability of the X-ray telescope, it is possible to achieve, in addition to original high sensitivity of the X-ray telescope, resolution exceeding the resolution of the X-ray telescope alone.

According to this embodiment, since the background may be suppressed low by the light condensing ability of the X-ray telescope, sensitivity is high even under a high background environment such as the outer space.

According to this embodiment, since the size of the detector may be reduced, it is easy to introduce a detector having high energy resolution and high polarization sensitivity.

In the embodiment, the X-ray telescope including the plurality of reflectors arranged in a concentric and layered manner is used as the telescope. However, the present invention is not limited to this and may be applied to any appropriate telescope such as a refracting telescope or a telescope for an infrared wavelength region.

About the present invention, the several embodiments are explained above for illustration. However, the present invention is not limited to this. It would be apparent to those skilled in the art that various modifications and corrections may be made about forms and details without departing from the scope of the present invention.

EXPLANATIONS OF LETTERS OR NUMERALS

1 X-ray telescope, 2a-1 to 2b-3 reflector, 3 two-dimensional detector, 4 housing, 5 image reconstructing device, 6 first slit member, 7 second slit member, 6a, 7a passage blocking region, 6b, 7b, slit (passage allowable region), 8 holding member

The invention claimed is:
1. A telescope system comprising:
a telescope comprising a position detectable detector that is configured to detect an observation target electromagnetic wave, wherein the position detectable detector is offset from a focal plane of the telescope; and
a selective shielding unit in front of the position detectable detector, the selective shielding unit including at least one member including a passage allowable region for the observation target electromagnetic wave and a passage blocking region for the observation target electromagnetic wave, wherein the passage allowable region and the passage blocking region are arranged such that an observation image can be reconstructed from a sensor image detected by the position detectable detector.

2. The telescope system according to claim 1, further comprising an image reconstructing device that is configured to reconstruct the observation image based on the sensor image.

3. The telescope system according to claim 1, further comprising an image reconstructing device configured to reconstruct the observation image by inversely transforming the sensor image.

4. The telescope system according to claim 1, further comprising an image reconstructing device configured to reconstruct the observation image by acquiring, in advance, a correspondence relation between an incident angle of an electromagnetic wave and a pattern of an image detected in the position detectable detector with respect to the electromagnetic wave at the incident angle and referring to the correspondence relation.

5. The telescope system according to claim 1, wherein the telescope is an X-ray telescope including a plurality of reflectors arranged in a concentric and layered manner.

6. The telescope system according to claim 1, wherein the passage allowable region and the passage blocking region are each radially formed on the at least one member.

7. A telescope system comprising:
a telescope comprising a position-sensitive detector that is offset from a focal plane of the telescope; and
a selective shielding unit configured to shield the position-sensitive detector, the selective shielding unit comprising:
a first member comprising a periodic arrangement of slits; and
a second member comprising the periodic arrangement of slits, wherein the second member is arranged parallel to the first member and the periodic arrangement of slits of the second member are rotationally offset with respect to the periodic arrangement of slits of the first member.

8. The telescope system of claim 7, wherein the periodic arrangement of slits of the second member are rotationally offset with respect to the periodic arrangement of slits of the first member by a half angle of a central angle of the slits of the periodic arrangement of slits.

9. A telescope system comprising:
a telescope; and
a selective shielding unit including at least one member including a passage allowable region for an observation target electromagnetic wave and a passage blocking region for the observation target electromagnetic wave, wherein the telescope includes a position detectable detector that detects the observation target electromagnetic wave on a surface different from a focal plane of the telescope,
the selective shielding unit is disposed on a front side of the position detectable detector, and
patterns of the passage allowable region and the passage blocking region of the at least one member and disposition of the at least one member are set to allow for reconstruction of an observation image based on an image detected in the position detectable detector,
wherein the reconstruction is performed by acquiring, in advance, a correspondence relation between an incident angle of an electromagnetic wave and a pattern of an image detected in the position detectable detector with respect to the electromagnetic wave at the incident angle and referring to the acquired correspondence relation.

\* \* \* \* \*